United States Patent [19]

Geiger et al.

[11] Patent Number: 4,672,587

[45] Date of Patent: Jun. 9, 1987

[54] INTEGRATABLE, BUS-ORIENTED TRANSMISSION SYSTEM

[75] Inventors: Gerhard Geiger, Schliersee; Michael Strafner, Munich, both of Fed. Rep. of Germany

[73] Assignee: Siemens Aktiengesellschaft, Berlin and Munich, Fed. Rep. of Germany

[21] Appl. No.: 614,569

[22] Filed: May 29, 1984

[30] Foreign Application Priority Data

Jun. 1, 1983 [DE] Fed. Rep. of Germany ....... 3319980

[51] Int. Cl.$^4$ .............................................. G11C 13/00
[52] U.S. Cl. .................................... 365/230; 365/189
[58] Field of Search ............... 365/182, 189, 230, 231, 365/233

[56] References Cited

PUBLICATIONS

IBM Technical Disclosure Bulletin entitled "Data Bus Precharge", J. C. Hsieh, Nov. 1975, vol. 18, No. 6, pp. 1871–1872.

Siemens–SAB 8048 8 Bit Single Chip Microcomputer Sep., 1982.

*Primary Examiner*—Terrell W. Fears

[57] ABSTRACT

A monolithically integratable transmission system for binary information has at least one address source which is connected to at least one address sink via an address bus. The address sink is respectively allocated to a register means connected to a data bus. A clock generator generates a first clock signal and a non-overlapping, phase-shifted second clock signal. The address bus and the data bus are precharged during the first clock signal and access of an addressed register means to the data bus occurs during the second clock signal. In the time span between the two clock signals, the address bus is charged with the address signals by discharging.

9 Claims, 6 Drawing Figures

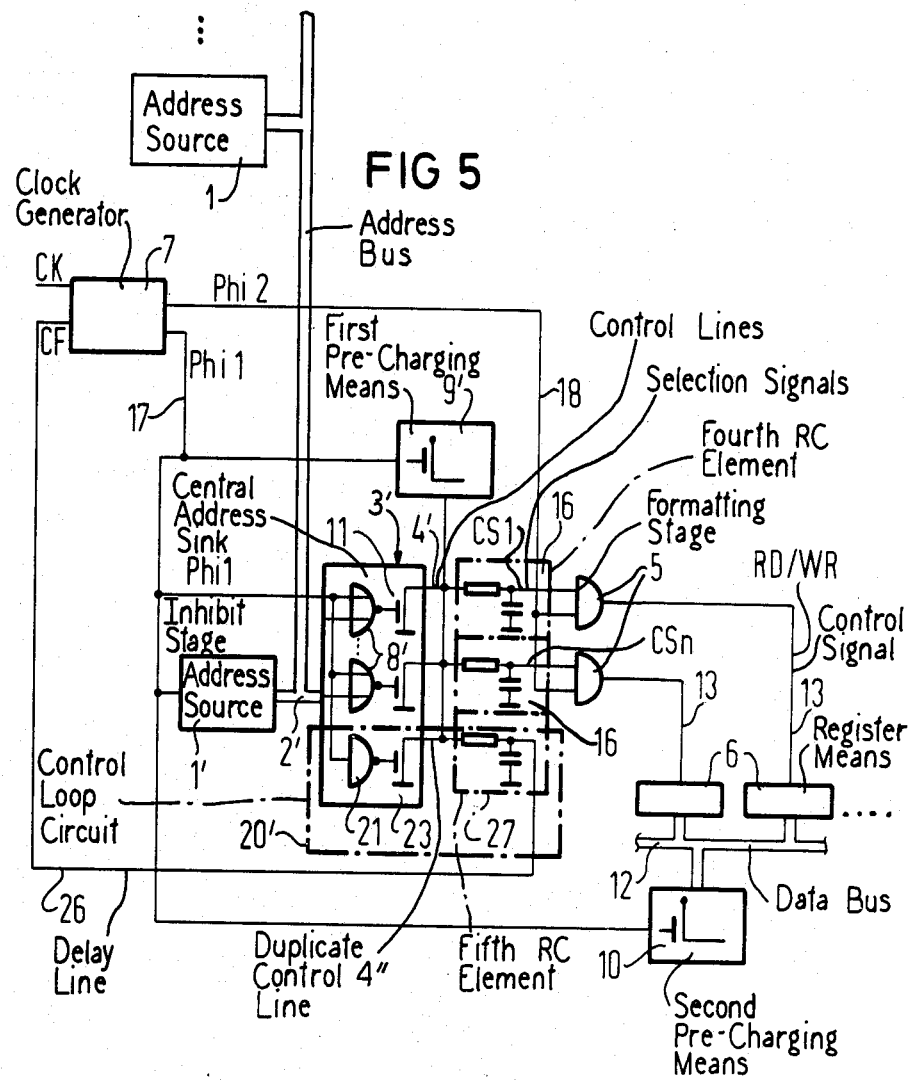

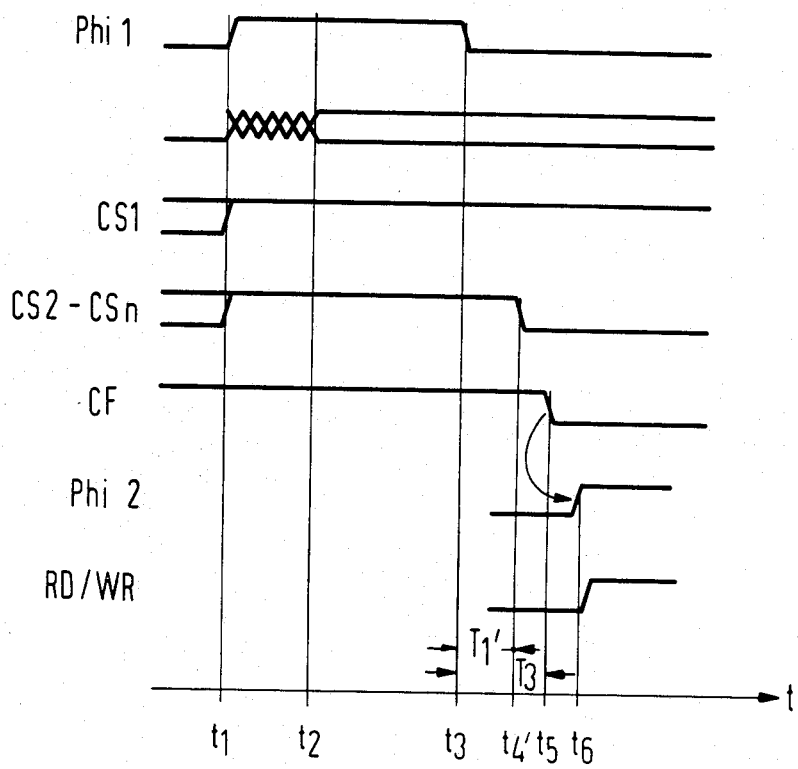

INTEGRATABLE, BUS-ORIENTED TRANSMISSION SYSTEM

BACKGROUND OF THE INVENTION

The invention relates to a monolithically integratable transmission system for binary information comprising at least one address source that is connected via an address bus to at least one address sink. At least one register means for write-in and read-out of binary coded data respectively allocated to an address sink is activatable via a respective selection line and is connected to a data bus. A clock generator for generating two phase-shifted, non-overlapping clock signals is provided. A first precharging unit for precharging the data bus is driven in accordance with a first clock signal and a register means for write-in and read-out of binary coded data is addressed in accordance with a second clock signal.

It is known in the construction of data processing systems to provide bus-oriented transmission systems which comprise an address bus and a data bus. A first bus structure may be characterized by a central address bus which is connected to a plurality of decentralized decoders for the selection of a register means. Another typical system structure comprises a central address decoder from which control lines lead in star-like fashion to a plurality of register units.

Dependent on their length, all signal lines of the transmission system are affected by an undesired transient response behavior given application of signals. In order to guarantee that all transients have ended given application of address and data signals, the output and reception of signals requires a strictly synchronous clocking.

A stable signal level can be achieved in a short time since the corresponding signal line is precharged with a high level that can be discharged in a short time under given conditions in accordance with the signal pattern. In a two-clock system, the data bus is precharged in a first clock phase while the address is connected to the address bus. The control signals decoded therefrom must be stable before the end of the first phase. In the second phase, the data pattern is connected to the precharged data bus, whereas the address bus remains stable.

As short as possible a discharging or charging time of the address bus is desired in order to increase the switching speed. The time available for this purpose, given an address change, is identical for both operations, so that a charging operation in NMOS technology requires a longer time than a discharging operation for physical reasons. A charging transistor must be dimensioned relatively large in order to equalize the time difference. This results in a correspondingly larger surface requirement and power consumption, this being particularly felt given a system structure having a plurality of address sources. There is also the danger that signals from a plurality of signal sources will overlap and that high current spikes thus arise.

SUMMARY OF THE INVENTION

It is an object of the invention to increase the switching speed given a data transmission system of the type initially defined and to avoid the disadvantages of a high surface requirement and power consumption.

This object is achieved by providing a clock generator means for generating first and second phase shifted clock signals having non-overlapping activation levels. A first precharging means is provided for precharging the address bus in accordance with the activation level of the first clock signal. A second precharging means is provided for precharging the data bus in accordance with the activation level of the first clock signal. Means are provided for addressing the register means in accordance with the activation level of the second clock signal. The at least one address source means charges the address bus with an address signal in a time between the activation levels of the first and second clock signals.

The invention has the advantage that both control lines or the address bus as well as the data bus are prechargeable in a two-phase clock system. The charging thus ensues during a non-critical time phase. It is further assured that no danger of overlap of address signals that are generated by a plurality of address sources exists within the transmission system. The transient response behavior of the control line is taken into consideration by the control loop so that multiple addressing is impossible.

BRIEF DESCRIPTION OF THE DRAWINGS

FIG. 5 shows details of this second data transmission system; and

FIG. 6 shows the chronological path of line levels according to FIG. 5.

DESCRIPTION OF THE PREFERRED EMBODIMENTS

Figure 1:
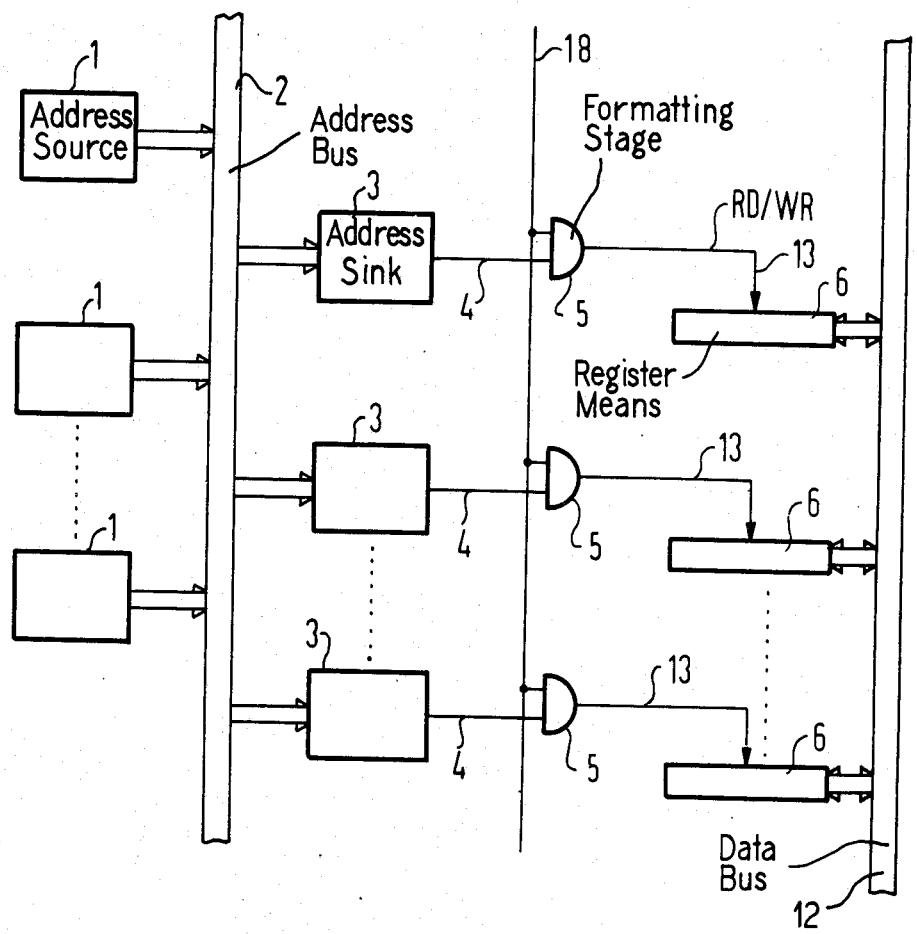
FIG. 1 schematically shows a first embodiment of a data transmission system according to the invention.

As shall be described below with reference to FIGS. 1-6, address bus 2 and data bus 12 are chargeable with address and data signals, respectively, under strict chronological clocking (FIG. 1). It is thus a significant feature of the data transmission system that both the address bus 2 as well as the data bus 12 are precharged in one of two prescribed clock phases phi 1 and phi 2.

What is meant by precharging is that the corresponding line in a defined initial condition is charged with a logical level 1 and that a logical level 0 is produced subsequently by means of discharging in order to produce a data pattern under given conditions.

Figure 2:
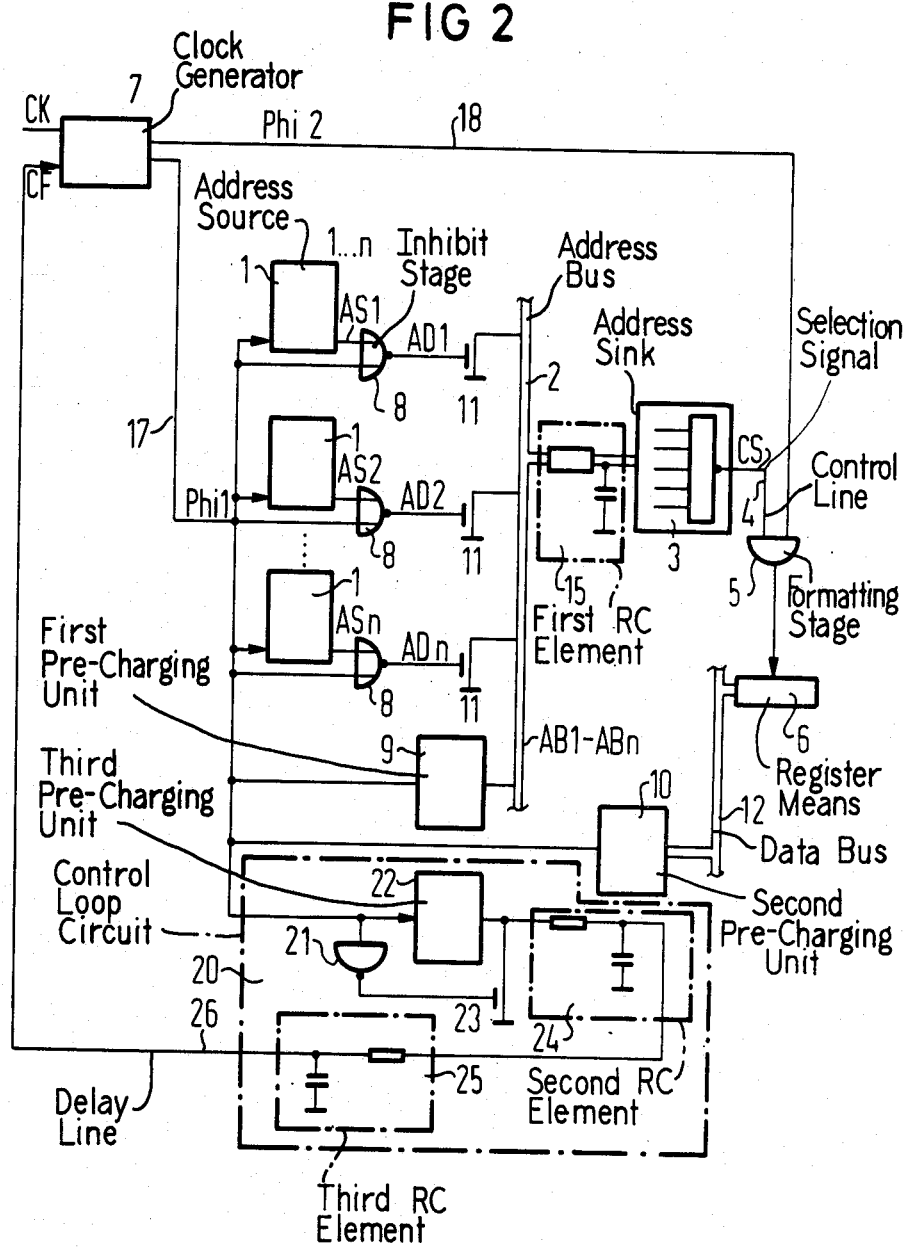
FIG. 2 shows details of the first data transmission system.

The transmission system in FIGS. 1 and 2 is characterized by a central address bus 2 and by decentralized address sinks 3. This structure is employed, for example, when a plurality of address sources 1 lie at the address bus 2 or when one address source 1 is at a distance from one or more groups of address sinks 3. Due to its length, the address bus exhibits a parasitic transit time $T_1$ which is schematically illustrated by means of a first RC element 15. The address source 1, a microprocessor type Siemens SAB 8048, may be employed.

The address sinks 3 respectively contain a decoder which emits a selection signal CS over a control line 4 to an allocated formatting stage 5 when the corresponding register means 6 for write-in and read-out of binary coded data is addressed. All formatting stages 5—these consisting of an AND element in the examples shown—lie in common at their input side at a clock line 18 (second clock line) which can be charged with a clock signal (second clock signal phi 2). A control signal RD/WR on a control line 13 is connected to the allocated register means 6 in this fashion with a synchronous clocking. Depending on the use, the control signal RD/WR serves to read data in from the data bus 12 or to read data out onto the data bus 12.

As shown in FIG. 2, a first or second precharging unit 9, 10 is provided for precharging the data bus 12. The charging thus ensues chronologically in controlled fashion via a first clock line 17 by means of a first clock signal phi 1.

The first clock signal phi 1 and the second, phase-shifted clock signal phi 2 that does not overlap with the first clock signal are derived by a clock generator 7 from an input clock Ck. The second clock signal phi 2 is connected to the formatting stages 5 via a second clock line 18.

The address bus 2 precharged to the logical level 1 during the duration of the first clock signal phi 1 is subsequently charged with an address by one of the address sources before the beginning of the second clock signal phi 2. The corresponding address combination is obtained such that one or more of the address lines AD1 through ADn is discharged under given conditions by means of first discharge devices dependent on an output signal AS1 through ASn. These discharge devices consist, for example, of MOSFETs 11 whose controlled segments are connected to ground potential. A synchronous connection to the address bus 2 occurs via inhibit elements 8 which consist of NOR elements in the examples shown. An inhibit stage 8 is allocated to each address source 1, said inhibit stage 8 being connected at the input side to the address source and to the first clock line 17, and being connected at the output side to the allocated MOSFET 11.

Before the control signal RD/WR is connected to the register means, all transients on the address bus and the following stages must have decayed in order to prevent a multiple addressing. The transmission system therefore comprises a control loop circuit 20 whose output signal is connected to a control input of the clock generator 7 via a control line 26. The control loop circuit 20 represents a simulation of the address signal path from the output of the address sources 1 up to the output of the formatting stages 5.

The control loop comprises a third precharging means 22 and a transit time delay unit which is comprised of second and third RC elements 24, 25. The time constant of the second RC element 24 thus corresponds to the time constant $T_1$ of the first RC element 15 of the address bus 2 and the time constant $T_2$ of the third RC element 25 corresponds at least to the delay time $T_3$ of the address sinks 3.

The first, second and third precharging means preferably comprise MOSFETs whose controlled segments connect the line to be precharged to an operating potential.

The delay line 26 as well as the address bus 2 are precharged for the duration of the first clock signal phi 1. With the end of the first clock signal phi 1, the delay line is discharged via a second discharge means 23 which is comprised of a MOSFET whose control input is connected to the first clock line 17 via an inverter 21. The level change is connected to the clock generator 7 delayed by the transit times $T_1$, $T_2$. This control signal CF releases the beginning of the second clock signal phi 2, and thus the access to the data bus 12. In order to guarantee the validity of the addresses on the address bus 2, the time between the first and second clock phase phi 1, phi 2 is thus extended under given conditions.

The function of the first transmission system shall be described further in the following with reference to FIG. 3.

Figure 3:
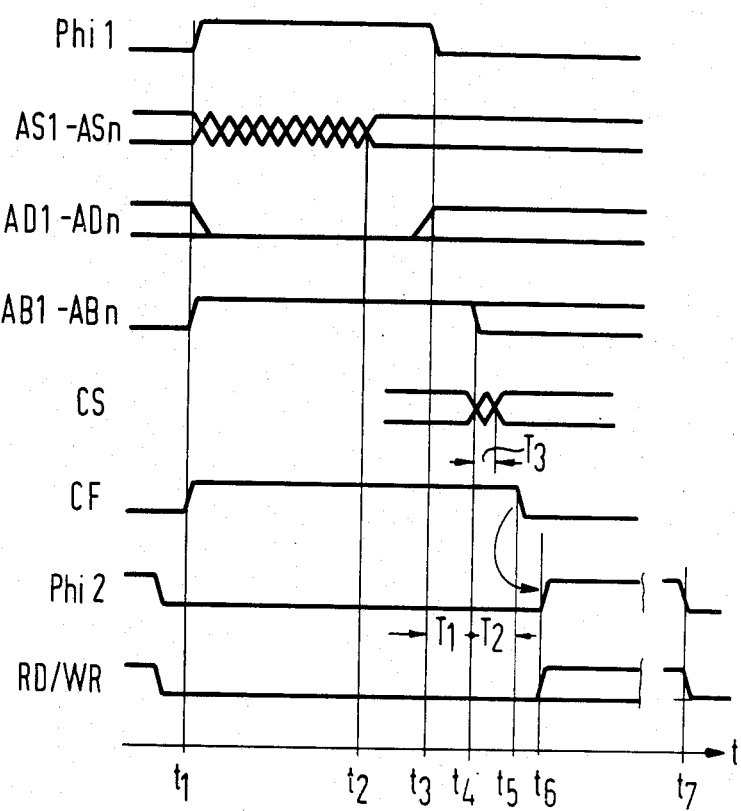
FIG. 3 shows the chronological path of line levels in FIG. 2.

The curves of the first clock signal phi 1 of the output signals AS1 through ASn, of the control signals AD1 through ADn for the MOSFETs 11, of the address bus lines AB1 through ABn, of the selection signal CS, of the control signal CF, of the second clock signal phi 2, and of the control or drive signal RD/WR are shown over the time axis t in FIG. 3. A level change between one of the logical levels 0 or 1, respectively, occurs under given conditions at one of the seven successive points in time $t_1$ through $t_7$. The first clock signal phi 1 is effective, i.e. has an activation level with a logical level 1 between the points in time $t_1$ through $t_3$. The second clock signal phi 2 is effective, i.e. has an activation level which is phase-shifted with the logical level 1 between the points in time $t_6$ and $t_7$. A time shift guarantees that the two clock signals do not overlap. One of the address sources 1 is driven by an executive sequencer (not shown) with the beginning of the first clock signal phi 1. The output signal AS1 through ASn of the corresponding address source 1 is transient up to point in time $t_2$ before it assumes a defined level. Dependent on this undefined status, the allocated output signals AD1 through ADn of the inhibit stage 8 are clearly determined no later than point in time $t_3$, so that a drive of the MOSFETs 11 is effective. The discharge of the address bus lines AB1 through ABn which are precharged to the level 1 from $t_1$ through $t_3$ does not take effect until point in time $t_4$ because of the parasitic transit time $T_1$. A second delay time $T_3$ that depends on the address sink 3 is added to this first delay time $T_1$. The second clock phase phi 2 with which the control signal RD/WR takes effect at the register means 6, may only begin when the allocated drive signal has assumed a defined status in order to prevent a multiple addressing of register means 6. It is for this reason that, in addition to the transit time simulation of the address bus 2 by the second RC element 24, all further transient phenomena that may occur are taken into consideration by the third RC element 25 in the control loop circuit 20. The discharge of the control line 26 is delayed until at least point in time $t_5$ until all transient phenomena have decayed. Initiated by the logical level 0 on the control line 26, the second clock signal phi 2 is subsequently started at point in time $t_6$ via the clock generator 7. The connection of the addressed register means 6 to the data bus with the beginning of the second clock phase phi 2 thus surely occurs after the stabilization of the addresses.

Figure 4:
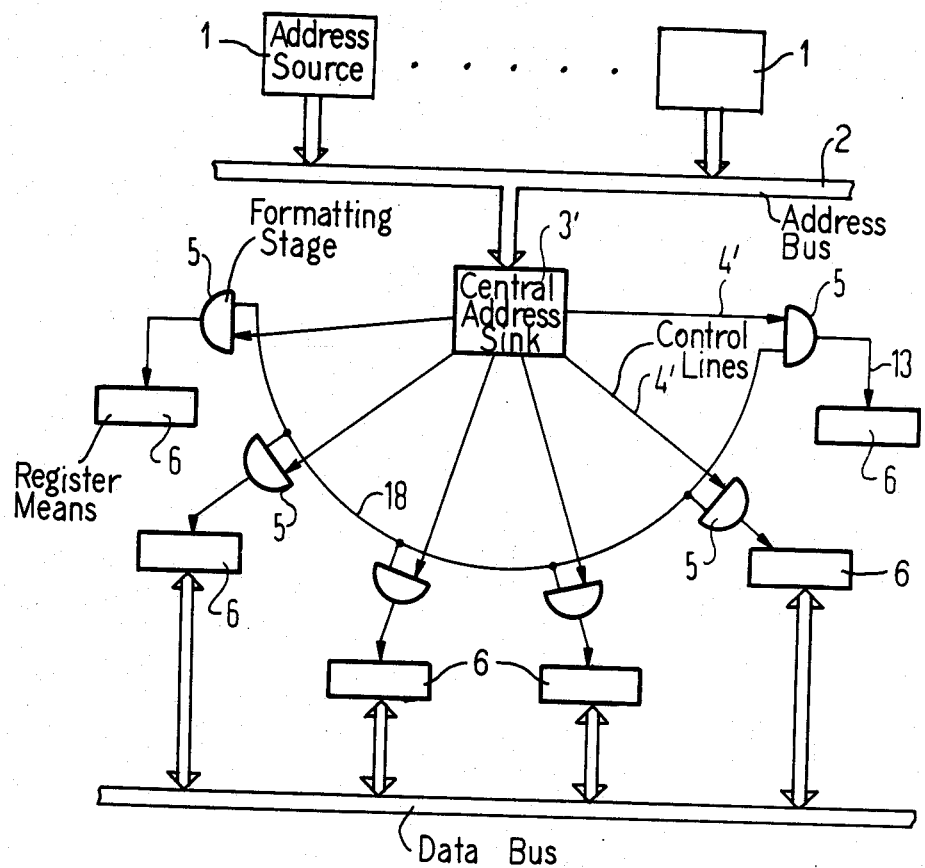
FIG. 4 schematically shows a second embodiment of a data transmission system according to the invention.

FIG. 4 and FIG. 5 show a structure of the second embodiment of the data transmission system, an address bus 2, a data bus 12, several address sources 1, and several register means 6. The structure of the second data transmission system is characterized by a central address sink 3' comprising an address decoder and proceeding from which control lines 4' distribute to a plurality of register means 6. This structure can be employed when the register means 6 are distributed, for example, in star-like fashion around the address sink 3'. Because of their length, the control lines 4' in this case are affected by an undesirably long transit time in comparison to which the transit time of the relatively short address bus 2' is negligible.

As shown in FIG. 5, the structure of FIG. 4 can be combined with the structure of FIG. 1. The control lines 4' are connected to the first precharging means 9'. The delay line 26 of the control loop circuit 20' is connected to the clock generator 7. In order to compensate the signal transit times $T_1$ of the control lines 4' which depend on the schematically indicated fourth RC elements 16, the delay line 26 of the control loop 20' has a fifth RC element 27 by means of which the signal transit time in the control loop 20' is delayed by at least the delay time $T'_1$.

FIG. 5 is expanded in relation to FIG. 4 by circuit units which ensure that the transmission paths are preloaded and that the data transfer only takes place after a signal stabilization has taken place.

The arrangement according to FIG. 5 operates in the following fashion. Via the first precharging means 9' all control lines 4' are commonly charged. The precharging means 9' is comprised, for example, of a FET, whose control path is subjected to an operating voltage VDD. If one of the address sources 1 loads an address on the address bus 2 the latter is decoded by the central address sink 3'. The decoded addresses are then connected to the exclusive OR circuits 8', which are respectively associated with one of the registers 6'. If one of the registers 6' is addressed, then the address signal level is logic level "1", i.e., the FET 11 blocks, and the respective control line 4' is not discharged.

All exclusive OR circuits 8' are subject to the first clock pulse signal PHI 1. As soon as the signal drops to logic level "0", all non-addressed control lines 4', after a delay time T1, likewise drop via the exclusive OR circuits 8'. The delay is dependent upon the time constant of the respective control line (RC-member 16). In order to ensure that the signals on all control lines CS 1 to CSN are stable, the control loop circuit 20' is provided. The duplicate control line 4" of the control line 4' is contained in circuit 20' and is discharged via the exclusive OR circuit 21 and the FET 23. The delay time is determined by the fifth RC member 27 in such a fashion that the delay time T3 on the delay line 26 is longer than the delay time T1 on the control lines 4'. The edge of the delay signal CF of the control loop circuit 20' controls the commencement of the second clock pulse signal PHI2. If the latter assumes the value logic level "1", via the corresponding AND circuit 5 (formatting stage) the control signal RD or RW, respectively, is connected to the register 6. In the case of the control signal RD, the data R is transferred from the data bus 12 into the register 6. In the case of the control signal WR, the data R is read out of the register 6 onto the data bus 12.

The signal progressions in FIG. 6 show the example that a register means 6 is selected via a first selection signal CS1. The corresponding control line—which is precharged with the logical level "1" during the duration of the first clock signal phi 1, like the other control lines chargeable with the selection signals CS2 through CSn—is therefore not discharged via the allocated MOSFET 11. After the delay time $T'_1$, the control lines with the control signals CS 2 through CSn are discharged to the logical level 0 at point in time $t_4$. Dependent on the overall delay time $T'_2$ of the control loop, the control signal CF assumes the logical level 0 at point in time $t_5$. This change effects the beginning of the second clock signal phi 2.

Although various minor changes and modifications might be proposed by those skilled in the art, it will be understood that we wish to include within the claims of the patent warranted hereon all such changes and modifications as reasonably come within our contribution to the art.

We claim as our invention:

1. A monolithically integrated transmission system for binary information, comprising:
    at least one address source means connected via an address bus to at least one address sink means for creating selection signals;
    at least one register means connected to the address sink means for write-in and read-out of binary coded data and for activation by the selection signals via a control line, said register means being connected to a data bus;
    clock generator means for generating first and second phase shifted clock signals having non-overlapping activation levels;
    a first precharging means for precharging the address bus in accordance with the activation level of the first clock signal;
    a second precharging means for precharging the data bus in accordance with the activation level of said first clock signal;
    means for addressing said register means in accordance with the activation level of said second clock signal; and
    said one address source means charging the address bus with an address signal in a time between the activation levels of said first and second clock signals.

2. A transmission system according to claim 1 wherein an inhibit means is provided at each output of the address source means for inhibiting an address signal during the activation level of the first clock signal.

3. A transmission system according to claim 1 wherein an inhibit circuit means is provided at an output of the address sink for inhibiting selection signals during the activation level of the first clock signal.

4. A transmission system according to claim 2 wherein the inhibit circuit means comprises a NOR gate which is connected at an input side to the address source means and to the first clock line.

5. A transmission system according to claim 1 wherein said clock generator means connects to an output of a control loop circuit means for emitting a control signal to influence beginning of the second clock signal at the clock generator means; said control loop circuit means comprising a control line which is prechargeable by a third precharging means during the activation level of the first clock signal; said control loop circuit means having means for simulating a transit time behavior of the address bus, said means including at least one delay means; and said control loop circuit means having a discharge means for discharging the control line at an end of the activation level of the first clock signal.

6. A monolithically integrated transmission system for binary information, comprising:
    at least one address source means connected via an address bus to at least one address sink means for creating selection signals;
    at least one register means for write-in and read-out of binary coded data connected to the address sink means, said register means being activated by the selection signals via a respective control line, said register means being connected to a data bus;

clock generator means for generating first and second phase shifted clock signals having respective activation levels which are non-overlapping;

a first precharging means for precharging the control line in accordance with the activation level of the first clock signal;

a second precharging means for precharging the data bus in accordance with the activation level of said first clock signal;

means for addressing said register means in accordance with the activation level of said second clock signal; and said at least one address source means charging the address bus with the selection signals in a time between activation levels of said first and second clock signals.

7. A transmission system according to claim 6 wherein an inhibit circuit means is provided at an output of the address bus for inhibiting a selection signal during the activation level of the first clock signal.

8. A transmission system according to claim 7 wherein the inhibit circuit means comprises a NOR gate which is connected at an input side to the address bus and to the first clock line.

9. A transmission system according to claim 6 wherein said clock generator means connects to an output of a control loop circuit means for emitting a control signal to influence beginning of the second clock signal at the clock generator means; said control loop circuit means having means for simulating a transit time behavior of the control line said means including at least one delay means, and said control means having a discharge means for discharging a duplicate control line in dependence upon the first clock signal.

* * * * *